United States Patent
Li et al.

(10) Patent No.: US 11,054,273 B2
(45) Date of Patent: Jul. 6, 2021

(54) GENERATING A 2D-NAVIGATION MAP FOR COLLISION-FREE NAVIGATION BY MULTIPLE ROBOTS

(71) Applicant: Rapyuta Robotics Co., Ltd, Tokyo (JP)

(72) Inventors: Wen Zheng Li, Tokyo (JP); Hendrik Skubch, Tokyo (JP)

(73) Assignee: Rapyuta Robotics Co., Ltd., Tokyo (JP)

( * ) Notice: Subject to any disclaimer, the term of this patent is extended or adjusted under 35 U.S.C. 154(b) by 191 days.

(21) Appl. No.: 16/366,286

(22) Filed: Mar. 27, 2019

(65) Prior Publication Data
US 2020/0309561 A1 Oct. 1, 2020

(51) Int. Cl.
| | |
|---|---|
| *G06T 11/20* | (2006.01) |
| *G06T 11/60* | (2006.01) |
| *G01C 21/36* | (2006.01) |
| *G01C 21/34* | (2006.01) |

(52) U.S. Cl.
CPC ..... *G01C 21/3667* (2013.01); *G01C 21/3461* (2013.01); *G01C 21/3626* (2013.01); *G06T 11/20* (2013.01); *G06T 11/60* (2013.01)

(58) Field of Classification Search
CPC ............ G01C 21/3667; G01C 21/3461; G01C 21/3626; G06T 11/20; G06T 11/60
See application file for complete search history.

(56) References Cited

U.S. PATENT DOCUMENTS

2018/0095467 A1* 4/2018 Perrone .................. B25J 9/1661

FOREIGN PATENT DOCUMENTS

| JP | 2010061293 A | 3/2010 |
|---|---|---|
| JP | 2012190405 A | 10/2012 |
| WO | WO2014181647 A1 | 11/2014 |

OTHER PUBLICATIONS

Philippsen, "Motion Planning and Obstacle Avoidance for Mobile Robots in Highly Cluttered Dynamic Environments", 2004, Ecole Polytechnique Federal de Lausanne (Year: 2004).*
Lopez, "A Predictive Online Path Planning and Optimization Approach for Cooperative Mobile Service Robot Navigation in Industrial Applications", Sep. 2017, IEEE (Year: 2017).*

(Continued)

*Primary Examiner* — Peter D Nolan
*Assistant Examiner* — Ashley L Redhead, Jr.
(74) *Attorney, Agent, or Firm* — Trupti P. Joshi (57) ABSTRACT

Embodiments herein disclose methods and systems for generating a 2D-navigation map for collision-free navigation by a plurality of robots. Initially, a 2D-navigation map generator executing at a cloud map server initiates a particle simulation to add a plurality of bubbles to an image of an area. Next, the 2D-navigation map generator executing at the cloud map server, processes the bubble simulation to determine a set of bubbles from the plurality of robots on the image that are overlapping free spaces of the area in the image. Next, the 2D-navigation map generator executing at the cloud map server, generates the 2D-navigation map by connecting the set of bubbles using a plurality of edges, wherein the plurality of edges indicate a navigation path to navigate within the area. Finally, based on the generated 2D-navigation map, the plurality of robots traverses from a current location to another location.

20 Claims, 6 Drawing Sheets

(56) References Cited

OTHER PUBLICATIONS

International Search Report dated Aug. 23, 2019, in the PCT Application No. PCT/IB2019/053459.
Written Opinion dated Aug. 23, 2019, in the PCT Application No. PCT/IB2019/053459.

* cited by examiner

GENERATING A 2D-NAVIGATION MAP FOR COLLISION-FREE NAVIGATION BY MULTIPLE ROBOTS

TECHNICAL FIELD

The embodiments herein relate to robot navigation and, more particularly to generating a 2D-navigation map for collision-free navigation by multiple robots.

BACKGROUND

Currently, usage of robots in industry has been increasing. Robots can be used in warehouses, storage locations, delivery management systems, etc. In order to navigate from one location to another location a robot needs a navigation map.

One of the main requirements for such navigation map is that it should ensure a collision free movement of robot within the warehouse. Current graphs, such as Voronoi graphs are very sparse and are not robust to ensure a collision-free navigation.

BRIEF DESCRIPTION OF THE FIGURES

The embodiments disclosed herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose methods and systems for generating a 2D-navigation map for collision-free navigation in an area by multiple robots. Referring now to the drawings, and more particularly to FIGS. 1 to 4, where similar reference characters denote corresponding features consistently throughout the figures, there are shown embodiments.

Embodiments herein disclose methods and systems for generating a 2D-navigation map for collision free navigation by multiple robots. In one embodiment, an obstacle map of a particular area is converted into a picture and then a particle simulation is applied on the picture to add bubbles covering the picture of the particular area. The bubbles in the simulation are automatically processed (moved or deleted), such that a final set of bubbles covering free spaces in the picture are identified. The bubbles covering the free space are then used to generate the 2D-navigation map by connecting edges between the bubbles to generate the 2D-navigation map. The 2D-navigation map is then used to determine a shortest collision-free navigation path between two points within the area.

Figure 1:
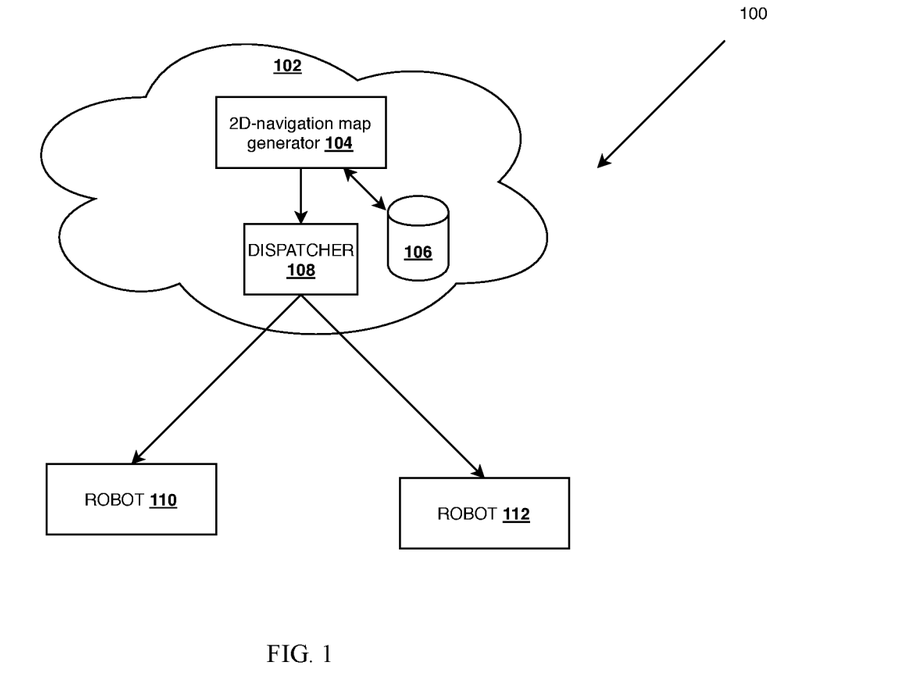
FIG. 1 is a block diagram illustrating a system to generate a 2D-navigation map for an area and determining a collision-free navigation path for multiple robots based on the 2D-navigation map, according to an embodiment.

FIG. 1 is a block diagram illustrating a system 100 to generate a 2D-navigation map for an area and determining a collision-free navigation path for multiple robots based on the 2D-navigation map, according to an embodiment. The system 100 comprises a cloud map server 102 that generates a 2D-navigation map for a particular area. Cloud computing is the on-demand availability of computer system resource without direct active management by user. Cloud map server includes several processors and memory to generate and store the 2D-navigation map. In one embodiment, the cloud map server 102 includes a 2D-navigation map generator 104 that imports an obstacle map of a particular area from a data store 106 and then converts it into a picture or image. An obstacle map is a map including details of various obstacles and free spaces at a particular area. For example, in a warehouse an obstacle map may include the details of racks, pathways, walls, etc. within the warehouse. The obstacle map may be converted into a picture or image for processing the obstacle map image. In one embodiment, an obstacle map metadata including the details of the obstacles included in the obstacle map is generated along with the image.

Next the 2D-navigation map generator 104 initiates a particle simulation on the generated image of the area. Initiating the particle simulation includes adding bubbles to the generated image until bubbles cover the entire space of the generated image. In one embodiment, each bubble represents a node within the 2D-navigation map. The size of the bubble may be proportional to a size of a robot that may use the 2D-navigation map for navigating the area.

The 2D-navigation map generator 104 then process the bubble simulation to determine a set of bubbles in the image, from the bubbles added to the generated image, which are overlapping the free spaces of the area. In an example, when the area is a warehouse, the free spaces are areas where the robots can move freely, for example, alleys, etc. and non-free spaces are racks, etc. which are obstacles for free robot movement. The 2D-navigation map generator 104 may determine the set of bubbles overlapping the free space of the area by deleting the bubbles overlapping the non-free spaces. The non-free spaces may be identified based on the obstacle map metadata that includes information of the areas that include obstacles. In one embodiment, the 2D-navigation map generator uses a repulsion/rebound operation to determine the bubbles that overlap with the free spaces of the area. In one embodiment, the repulsion/rebound operation may be simulated based on a "billiards" game where the billiards ball rebounds after hitting any of the edges of the billiard table or another ball on the billiard table. Based on the repulsion/rebound operation, the bubble moves back from its original position when it overlaps a non-free portion of the map and is positioned at an area that overlaps a free space of the area. In case of repulsion/rebound operations, the simulation continues to add bubbles until there are no free spaces of area remaining on the image. In an embodiment, a force field operation is used to determine the set of bubbles that are overlapping the free space. In this case, the bubbles are attracted by a force field to the portion of the image overlapping the free spaces and repulses from the portion of the image that is non-overlapping.

Next the 2D-navigation map generator 104 terminates the bubble simulation operation when the bubbles in the simulation are static. In one embodiment, the 2D-map generator 104 uses an energy minimization principle to ensure that the bubbles are static. Based on the simulation operation, the determined bubbles on the image may be covering only the portions of the images that are overlapping with free spaces in the image. Next the 2D-navigation map generator 104 generates a graph by connecting the bubbles on the image by edges, where the edges indicate paths that can be traversed by a robot for a collision-free navigation of the area. The broader paths can be depicted by a higher density of edges, whereas the narrower paths can be indicated by a lower density of edges. The 2D-navigation map generator 104 stores the generated 2D-navigation map in a data storage 106 of the cloud map server 102.

In an embodiment, cloud map server 102 further comprises a dispatcher 108 that is a query processor to determine a collision-free navigation path between two locations in the area. The dispatcher 108 is in wireless communication with a plurality of robots 110 and 112. A request may be received from any of the robots, for example robot 110, to traverse to a particular location in the area.

The dispatcher 108 receiving the request executes a query on the generated 2D-navigation map to determine the navigation path that has least probability of collision and takes minimum travel time to travel between the robots current position and the particular point in the area. In one embodiment, a navigation path includes one or more disjoint edges between the plurality of points that can be traversed by the robot 104 using the edges in the graph. The dispatcher 108 finally communicates the determined shortest distance path as navigation path to the robots 110 and 112. The robots 110 and 112 can traverse between the two locations based on the received navigation path.

The present invention therefore solves a technical problem in the field of robotic navigation. As the 2D navigation map is generated based on a bubble simulation that covers the entire area, the generated map is able to provide collision-free navigation path to the robots for navigating within the area.

Figure 2A:
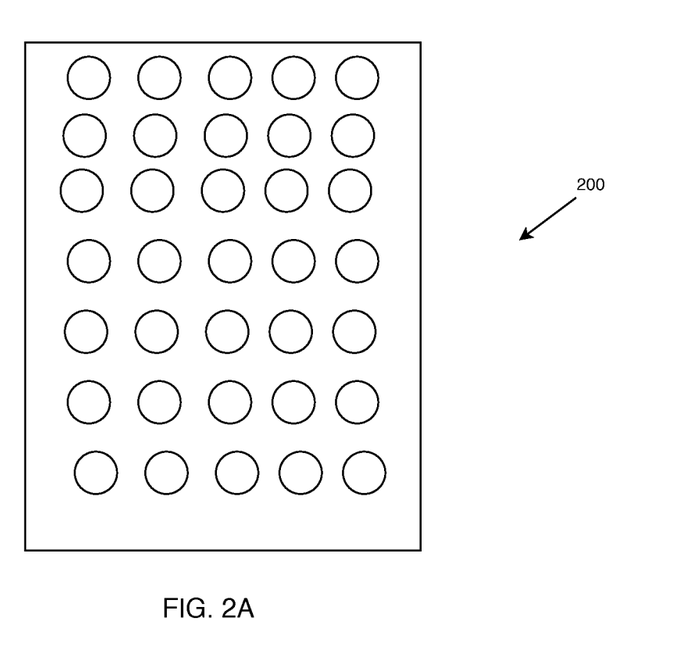
FIGS. 2A-2C are exemplary block diagram illustrating a process to generate the 2D-navigation map according to an embodiment.
Figure 2B:
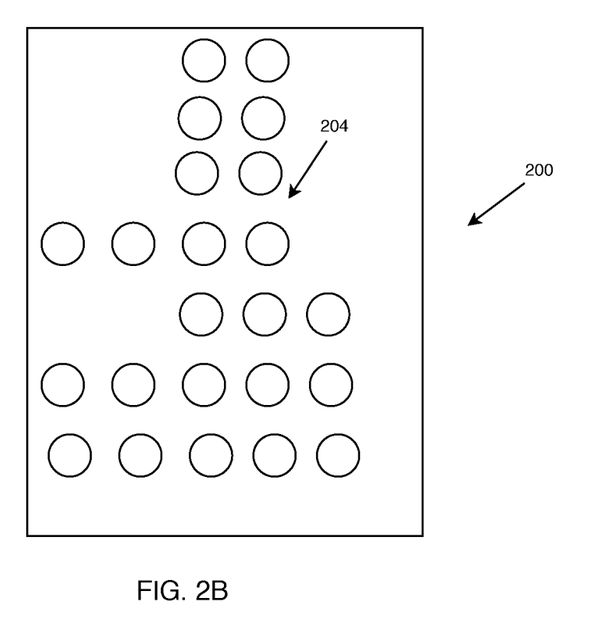
Figure 2C:
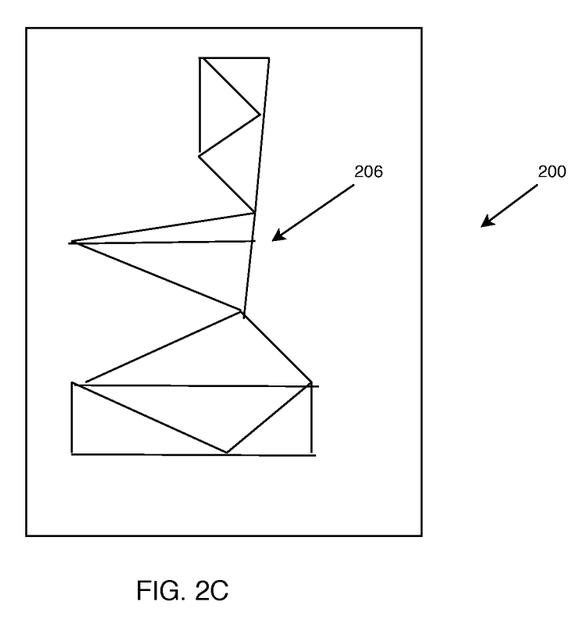

FIGS. 2A-2C are exemplary block diagrams illustrating a process to generate the 2D-navigation map according to an embodiment. As shown in FIG. 2A, the simulation operation is initiated on an image 200 of an obstacle map to cover the image of the obstacle map with bubbles.

In the example depicted in FIG. 2B, the bubbles covering the non-free portions of the area in the image 200 are removed, either by deletion or repulsion/rebound operation, such that image 200 includes bubbles overlapping the free area 204 that does not overlap a non-free area, i.e., an area that has object/obstruction. Finally, as shown in FIG. 2C, the navigation map generator generates a 2D-navigation map 206 by connecting the bubbles using edges, wherein the edges indicate paths that can be used to traverse the area.

Figure 3:
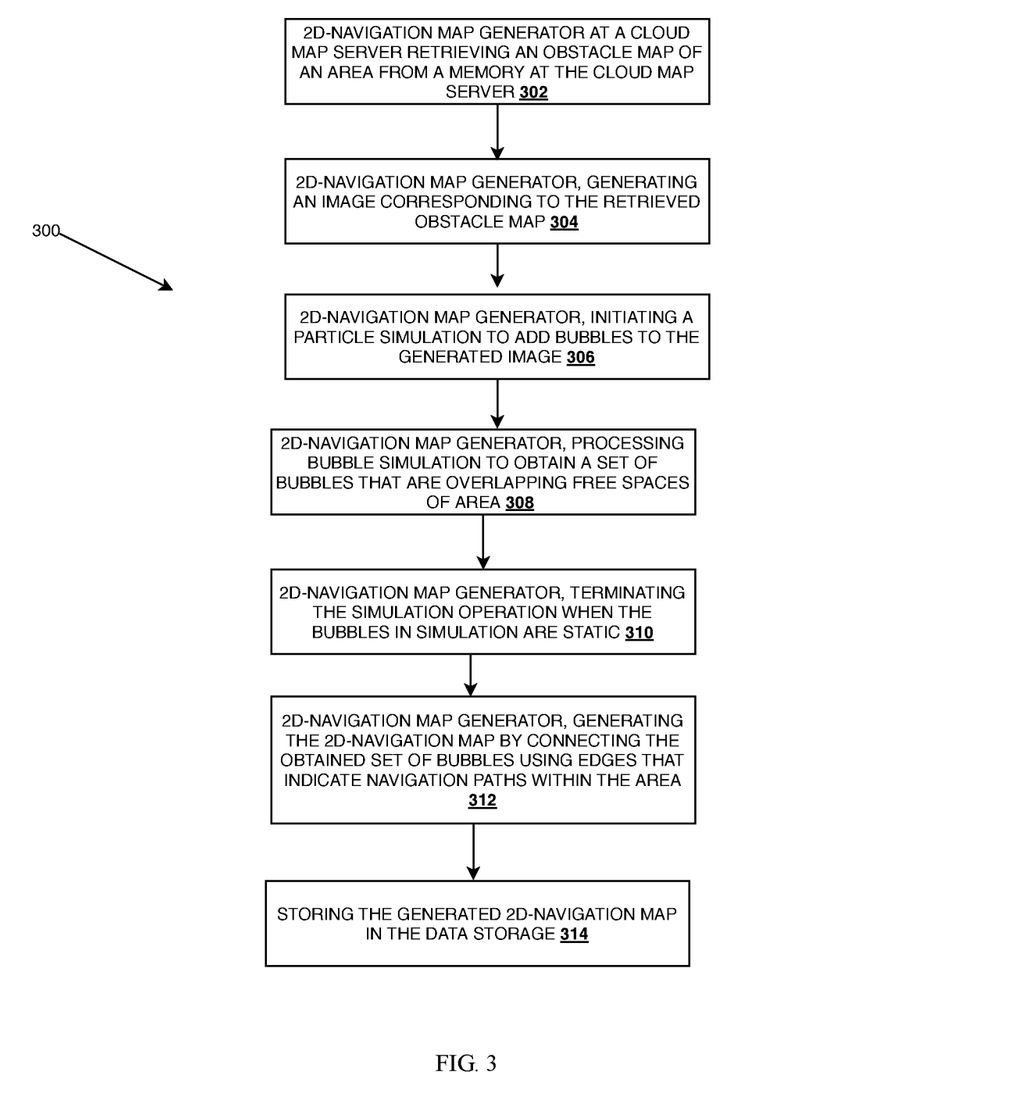
FIG. 3 is a block diagram illustrating a process to generate a 2D navigation graph for navigation in an area by multiple robots, according to an embodiment.

FIG. 3 is a block diagram illustrating a process 300 of generating a 2D navigation graph for navigation in an area by multiple robots, according to an embodiment. Initially a 2D-navigation map generator at a cloud map server retrieves an obstacle map of an area from a memory at the cloud map server (302). Next the 2D-navigation map generator generates an image corresponding to the retrieved obstacle map (304). The 2D-navigation map generator then initiates a particle simulation to add bubbles to the generated image (306). In one embodiment, the bubbles are added to the image until bubbles cover the entire space of the generated image. Next the 2D-navigation map generator processes the bubble simulation to determine a set of bubbles, from the plurality of bubbles added to the image, which are overlapping the free spaces of the area (308). As discussed above, the bubble simulation is processed such that the bubbles overlapping the non-free space are either deleted or moved (based on repulsion/rebound operation).

Next the 2D-navigation map generator terminates the bubble simulation operation when the bubbles in the simulation are static (310). Next the 2D-navigation map generator generates the 2D-navigation map by connecting the obtained set of bubbles using edges, wherein the edges indicate navigation paths to traverse the area (312). The broader paths can be depicted by a higher density of edges, whereas the narrower paths can be indicated by a lower density of edges. Finally, the 2D-navigation map generator stores the generated 2D-navigation map in the data storage (314). The various actions in method 300 may be performed in the order presented, in a different order or simultaneously. Further, in some embodiments, some actions listed in FIG. 3 may be omitted.

Figure 4:
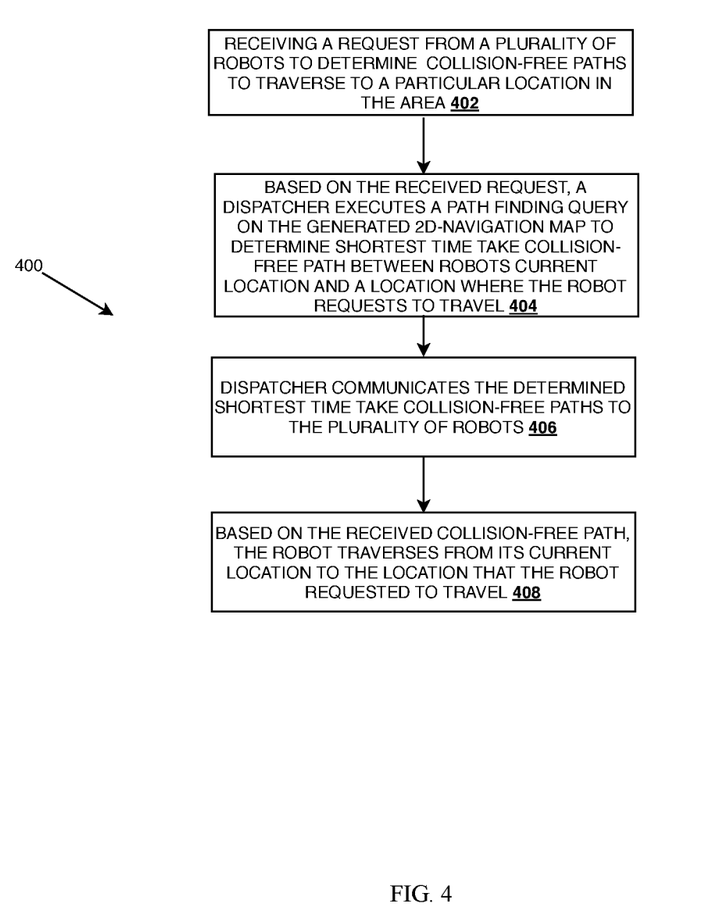
FIG. 4 is a flow diagram illustrating a process to navigate a plurality of robots in the area based on the generated 2D-navigation map, according to an embodiment.

FIG. 4 is a flow diagram illustrating a process 400 to determine navigation paths for a plurality of robots in the area based on the generated 2D-navigation map, according to an embodiment. Initially a request is received from a plurality robots to determine a collision-free path to traverse to a plurality of locations in the area (402). In one embodiment, the plurality of robots may each provide a corresponding location were the robots wants to traverse. Based on the received request, a dispatcher executes a path finding query on the generated 2D-navigation map to sequentially determine shortest time taken paths that are collision-free between the robots current location and a location where the robots requests to travel (404). In one embodiment, the dispatcher initiates the path finding operation in a particular order to ensure that the last robot in the sequence get at least a collision-free path to traverse to the location where the robot wants to traverse. For example, consider that there are 40 robots that want to traverse to 40 different locations. In this case, the dispatcher initiates the path finding operation for robot 1 and identifies a shortest path between robot 1 current location and the location where the robot 1 wants to traverse. Next the dispatcher initiates the path finding operation for robot 2 by selecting the shortest path between the robot 2 current location and the location where the robot 2 wants to traverse. In this case, the dispatcher assumes that path assigned to robot 1 is already allocated and it determines the shortest path for robot 2 based on remaining paths. This process is continued until a path is allocated to the last robot. The dispatcher communicates the determined shortest time taken and collision-free paths to the plurality of robots (406). Based on the received collision-free paths, the robot traverses from its current location to the location that the robot requested to travel. (408)

The embodiments disclosed herein can be implemented through at least one software program running on at least one hardware device and performing network management functions to control the network elements. The network elements include blocks, which can be at least one of a hardware device, or a combination of hardware device and software module.

The embodiment disclosed herein discloses methods and systems for generating a graph for a particular space using a particle simulation, wherein one or more robots can use the graph for navigation in that particular space. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments herein can be practiced with modification within the spirit and scope of the claims as described herein.

What is claimed is:

1. A computer implemented method to generate a 2D-navigation map for collision-free navigation by a plurality of robots, the method comprising: initiating a particle simulation to add a plurality of bubbles to an image of an area; processing a bubble simulation to determine a set of bubbles from the plurality of bubbles on the image that are overlapping free spaces of the area in the image, wherein determining the set of bubbles from the plurality of bubbles on the image uses repulsion and rebound operation; generating a 2D-navigation map by connecting the set of bubbles using a plurality of edges, wherein the plurality of edges indicate a navigation path to navigate within the area; and based on the generated 2D-navigation map, traversing the plurality of robots from a current location to another location.

2. The computer implemented method of claim 1, further comprising: receiving a request to determine a collision-free shortest time taken path for the plurality of robots to traverse from the current location to another location; and executing a path finding query on the generated 2D-navigation map to generate a collision-free shortest time taken path for the plurality of robots to traverse from the current location to another location.

3. The computer implemented method of claim 2, further comprising: communicating the collision-free path to the one or more of the plurality of robots.

4. The computer implemented method of claim 1, further comprising: retrieving an obstacle map of the area; and generating the image corresponding to the retrieved obstacle map.

5. The computer implemented method of claim 1, wherein processing the bubble simulation to determine a set of bubbles comprises: deleting a bubble from the plurality of bubbles that are overlapping a non-free space; and based on the deletion, determining the set of bubbles from the plurality of bubbles on the image.

6. The method, as claimed in claim 1, wherein the method further comprises terminating the bubble simulation when the plurality of bubbles in the simulation are static.

7. The computer implemented method of claim 1, wherein the repulsion and rebound operation comprises: moving a bubble from a first position that overlaps a non-free space of the area to a second position that overlaps a free space of the area.

8. A computer system to generate a 2D-navigation map for collision-free navigation by a plurality of robots, the system comprising: a memory to store program code; and a processor executing the program code to: initiate a particle simulation to add a plurality of bubbles to an image of an area; process a bubble simulation to determine a set of bubbles from the plurality of bubbles on the image that are overlapping free spaces of the area in the image, wherein determining the set of bubbles from the plurality of bubbles on the image uses repulsion and rebound operation; generate a 2D-navigation map by connecting the set of bubbles using a plurality of edges, wherein the plurality of edges indicate a navigation path to navigate within the area; and based on the generated 2D-navigation map, traverse the plurality of robots from a current location to another location.

9. The computer system according to claim 8, wherein the processor further executes the program code to: move a bubble from a first position that overlaps a non-free space of the area to a second position that overlaps a free space of the area.

10. The computer system according to claim 8, wherein the processor further executes the program code to: receive a request to determine a collision-free shortest time taken path for the plurality of robots to traverse from the current location to another location; and execute a path finding query on the generated 2D-navigation map to generate a collision-free shortest time taken path for the plurality of robots to traverse from the current location to another location.

11. The computer system according to claim 10, wherein the processor further executes the program code to: communicate the collision-free path to the one or more of the plurality of robots.

12. The computer system according to claim 10, wherein the processor further executes the program code to: retrieve an obstacle map of the area; and generate the image corresponding to the retrieved obstacle map.

13. The computer system according to claim 10, wherein the processor further executes the program code to: delete a bubble from the plurality of bubbles that are overlapping a non-free space; and based on the deletion, determine the set of bubbles from the plurality of bubbles on the image.

14. The computer system according to claim 10, wherein the processor further executes the program code to: terminate the bubble simulation when the plurality of bubbles in the simulation are static.

15. A non-transitory computer readable medium storing instructions that when executed by a computer causes the computer to: initiate a particle simulation to add a plurality of bubbles to an image of an area; process the bubble simulation to determine a set of bubbles from the plurality of bubbles on the image that are overlapping free spaces of the area in the image, wherein determining the set of bubbles from the plurality of bubbles on the image uses repulsion and rebound operation; generate a 2D-navigation map by connecting the set of bubbles using a plurality of edges, wherein the plurality of edges indicate a navigation path to navigate within the area; and based on the generated 2D-navigation map, traverse the plurality of robots from a current location to another location.

16. The non-transitory computer readable medium according to claim 15, wherein the computer further executes the program code to: receive a request to determine a collision-free shortest time taken path for the plurality of robots to traverse from the current location to another location; and execute a path finding query on the generated 2D-navigation map to generate a collision-free shortest time taken path for the plurality of robots to traverse from the current location to another location.

17. The non-transitory computer readable medium according to claim 16, wherein the computer further executes the program code to: communicate the collision-free path to the one or more of the plurality of robots.

18. The non-transitory computer readable medium according to claim 15, wherein the computer further executes the program code to: retrieve an obstacle map of the area; and generate the image corresponding to the retrieved obstacle map.

19. The non-transitory computer readable medium according to claim 15, wherein the computer further executes the program code to: delete a bubble from the plurality of bubbles that are overlapping a non-free space; and based on the deletion, determine the set of bubbles from the plurality of bubbles on the image.

20. The non-transitory computer readable medium according to claim 15, wherein the computer further executes the program code to: move a bubble from a first position that overlaps a non-free space of the area to a second position that overlaps a free space of the area.

* * * * *